(12) United States Patent
Tayyab et al.

(10) Patent No.: US 11,856,554 B2
(45) Date of Patent: Dec. 26, 2023

(54) RELAXATION OF UE MEASUREMENTS

(71) Applicant: NOKIA SOLUTIONS AND NETWORKS OY, Espoo (FI)

(72) Inventors: Muhammad Tayyab, Oulu (FI); Satya Krishna Joshi, Oulu (FI); Rustam Pirmagomedov, Oulu (FI); Timo Koskela, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/117,836

(22) Filed: Mar. 6, 2023

(65) Prior Publication Data
US 2023/0284179 A1 Sep. 7, 2023

(30) Foreign Application Priority Data

Mar. 7, 2022 (FI) ...................... 20225199

(51) Int. Cl.
*H04W 64/00* (2009.01)
*H04W 24/10* (2009.01)
*H04W 8/02* (2009.01)

(52) U.S. Cl.
CPC ........... *H04W 64/006* (2013.01); *H04W 8/02* (2013.01); *H04W 24/10* (2013.01)

(58) Field of Classification Search
CPC . H04W 64/00; H04W 64/003; H04W 64/006; H04W 8/00; H04W 8/02; H04W 8/04; H04W 8/06; H04W 24/00; H04W 24/02; H04W 24/04; H04W 24/10
See application file for complete search history.

(56) References Cited

U.S. PATENT DOCUMENTS

| 2021/0105643 | A1 | 4/2021 | Kim et al. |
| 2021/0286041 | A1 | 9/2021 | Jiang et al. |
| 2021/0352507 | A1 | 11/2021 | He |
| 2022/0369137 | A1* | 11/2022 | Reial ................. H04W 24/08 |

FOREIGN PATENT DOCUMENTS

| CN | 113473556 A | 10/2021 |
| WO | 2021/197241 A1 | 10/2021 |

OTHER PUBLICATIONS

Office Action dated Oct. 4, 2022 corresponding to Finnish Patent Application No. 20225199.
Finnish Search Report dated Oct. 4, 2022 corresponding to Finnish Patent Application No. 20225199.

(Continued)

*Primary Examiner* — Siu M Lee
(74) *Attorney, Agent, or Firm* — SQUIRE PATTON BOGGS (US) LLP

(57) ABSTRACT

This document discloses a solution for controlling measurements of a terminal device. According to an aspect, a method comprises: determining, on the basis of measurement data measured from a radio link, a distance between an access node and a terminal device and angular motion of the terminal device with respect to the access node; making a decision about a length of a time interval between consecutive radio measurements of the terminal device on the basis of the distance and the angular motion; and communicating the decision over the radio link.

16 Claims, 6 Drawing Sheets

(56) References Cited

OTHER PUBLICATIONS

Communication of Acceptance dated Feb. 23, 2023 corresponding to Finnish Patent Application No. 20225199.
M. Tayyab et al., "RRM Relaxation in Connected State for Reduced Capability (RedCap) NR UEs," 2021 17th International Symposium on Wireless Communication Systems (ISWCS), Sep. 6, 2021.
Vivo, "Evaluation on the Mobility Impact for RRM Measurement Relaxation", 3GPP TSG-RAN WG2 Meeting #106, Reno, USA, May 13-17, 2019, R2-1905962, 12 pages.
Extended European Search Report issued in corresponding European Patent Application No. 23159531.5-1216 dated Jul. 5, 2023.

* cited by examiner

RELAXATION OF UE MEASUREMENTS

CROSS REFERENCE TO RELATED APPLICATION

This application claims the benefit of Finnish Patent Application No. 20225199, filed Mar. 7, 2022. The entire content of the above-referenced application is hereby incorporated by reference.

FIELD

Various embodiments described herein relate to the field of wireless communications and, particularly, to radio resource management measurements performed by a terminal device of a cellular communication system.

BACKGROUND

A terminal device of a cellular communication system performs various radio resource management measurements. Some of such measurements include neighbour cell measurements in which the terminal device measures signals received from neighbouring cells for the purpose of a handover. Performing such measurements consumes power in the terminal device.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising at least one processor; and at least one memory configured to store instructions that cause the at least one processor to perform at least the following: determining, on the basis of measurement data, a distance between an access node and a terminal device and angular motion of the terminal device with respect to the access node; making a decision about a length of a time interval between consecutive radio measurements of the terminal device on the basis of the distance and the angular motion; and communicating the decision over the radio link or another radio link and causing the terminal device to conduct the consecutive radio measurements with the length of the time interval.

In an embodiment, the time interval indicates duration to the next radio measurement instant.

In an embodiment, the apparatus is configured select a first time interval upon detecting that the distance is decreasing or maintaining, and to select a second time interval shorter than the first time interval upon detecting that the distance is increasing.

In an embodiment, the apparatus is configured to compute at least the second time interval on the basis of a degree of said angular motion.

In an embodiment, the apparatus is configured to store information indicating a cell edge in terms of a distance to the access node, to use the distance and angular motion indicated by the measurement data to estimate a duration until the terminal device reaches the cell edge, and to select the time interval on the basis of the estimated duration.

In an embodiment, the time interval is shorter than the estimated duration.

In an embodiment, the apparatus is configured to: determine whether the distance is increasing or decreasing; if the distance is determined to be increasing, use the distance and the angular motion to determine the time interval; if the distance is determined to be decreasing, determining the time interval on the basis of the distance without the angular motion.

In an embodiment, the apparatus is configured to perform the following, if the distance is determined to be increasing: if the distance is determined to be increasing but at a speed lower than a determined threshold and if the angular motion is determined to be non-zero, computing the time interval on the basis of a distance to an edge of a cell provided by the access node and the threshold; and if the distance is determined to be increasing at a speed greater than the threshold, computing the time interval on the basis of the distance to the cell edge, the speed, and the angular motion.

In an embodiment, the apparatus is configured to determine, on the basis of the measurement data, whether or not there is a line-of-sight between the terminal device and the access node and, upon determining that there is no line-of-sight, to average the distance and the angular motion over a measurement window.

According to another aspect, there is provided a method comprising: determining, on the basis of measurement data measured from a radio link, a distance between an access node and a terminal device and angular motion of the terminal device with respect to the access node; making a decision about a length of a time interval between consecutive radio measurements of the terminal device on the basis of the distance and the angular motion; and communicating the decision over the radio link or another radio link and causing the terminal device to conduct the consecutive radio measurements with the length of the time interval.

In an embodiment, the time interval indicates duration to the next radio measurement instant.

In an embodiment, a first time interval is selected upon detecting that the distance is decreasing or maintaining, and a second time interval shorter than the first time interval is selected upon detecting that the distance is increasing.

In an embodiment, at least the second time interval is computed on the basis of a degree of said angular motion.

In an embodiment, the method further comprises storing information indicating a cell edge in terms of a distance to the access node, using the distance and angular motion indicated by the measurement data to estimate a duration until the terminal device reaches the cell edge, and selecting the time interval on the basis of the estimated duration.

In an embodiment, the time interval is shorter than the estimated duration.

In an embodiment, the method further comprises: determining whether the distance is increasing or decreasing; if the distance is determined to be increasing, using the distance and the angular motion to determine the time interval; if the distance is determined to be decreasing, determining the time interval on the basis of the distance without the angular motion.

In an embodiment, the method comprises determining, on the basis of the measurement data, whether or not there is a line-of-sight between the terminal device and the access node and, upon determining that there is no line-of-sight, to average the distance and the angular motion over a measurement window.

In an embodiment, the method further comprises storing information indicating a cell edge in terms of a distance to the access node, using the distance and angular motion indicated by the measurement data to estimate a duration until the terminal device reaches the cell edge, and selecting the time interval on the basis of the estimated duration.

In an embodiment, the method is performed by the terminal device, and wherein said communicating comprises the terminal device transmitting the time interval to the access node.

In an embodiment, the method is performed by the access node, and wherein the access node configures the terminal device to conduct the measurements by transmitting the time interval to the terminal device.

According to an aspect, there is provided a computer program product embodied on a computer-readable medium and comprising a computer program code readable by a computer, wherein the computer program code configures the computer to carry out a computer process comprising: determining, on the basis of measurement data measured from a radio link, a distance between an access node and a terminal device and angular motion of the terminal device with respect to the access node; making a decision about a length of a time interval between consecutive radio measurements of the terminal device on the basis of the distance and the angular motion; and communicating the decision over the radio link or another radio link and causing the terminal device to conduct the consecutive radio measurements with the length of the time interval.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
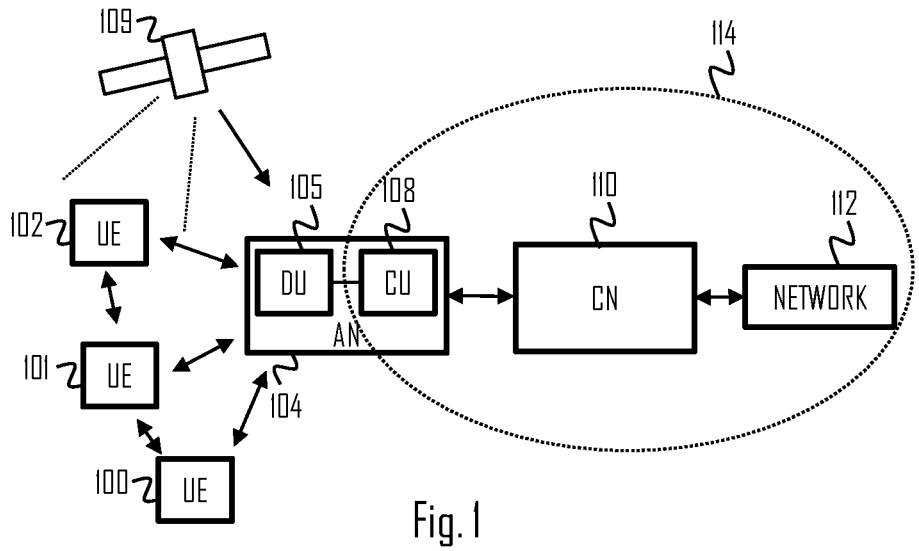

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, a network element in a radio access network or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. In the context of 5G New Radio, the core network employs a service-based architecture, as known in the art With respect to positioning, the service-based architecture (core network) comprises an access and mobility management function (AMF) and a location management function (LMF). The AMF provides location information for call processing, policy, and charging to other network functions in the core network and to other entities requesting for positioning of terminal devices. The AMF receives and manages location requests from several sources: mobile-originated location requests (MO-LR) from the terminal devices and mobile-terminated location requests (MT-LR) from other functions of the core network or from other network elements. The AMF selects the LMF for each request and uses its positioning service to trigger a positioning session. The LMF then carries out the positioning upon receiving such a request from the AMF. The LMF manages the resources and timing of positioning activities. An LMF uses a Namf_Communication service on an NL1 interface to request positioning of a terminal device from one or more access nodes, or communicates with the terminal device over N1 for UE-based or UE-assisted positioning. The positioning may include estimation of a location and, additionally, the LMF may also estimate movement or accuracy of the location information when requested. Connection-wise, the AMF is between the access node and the LMF and, thus, closer to the access nodes than the LMF.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave-sub-THz). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Radio resource management (RRM) relaxation is a topic in development of cellular communication systems. One aim is to reduce the power consumption of terminal devices by reducing RRM actions, e.g. neighbour cell measurements. The measurements may be reduced, for example, when a terminal device has low mobility (is stationary or nearly stationary) and/or when the terminal device is not at a cell edge. Solutions for determining and defining the cell edge exist in the literature. The cell edge may be defined in terms of a distance from a base station (access node) site, for example. The location and mobility of the terminal device may be measured by using state-of-the-art positioning methods. However, a conventional solution for determining the RRM relaxation is based on the distance which is prone to measurement errors. A reference signal reception power (RSRP), a received signal strength indicator (RSSI), or a similar metric indicating the distance via attenuation of a reference signal in a radio channel between the access node and the terminal device is conventionally used, and it is susceptible to blocking objects degrading the measurements. For example, in a very typical use case there are moving objects around the terminal device, e.g. vehicles, buildings etc. Even the access node may be mobile, increasing the probability of objects blocking the line-of-sight between the access node and the terminal device. Therefore, using the distance as a sole metric can cause the terminal device to exit from relaxed measurements unnecessarily, thus increasing the power consumption.

Figure 2:
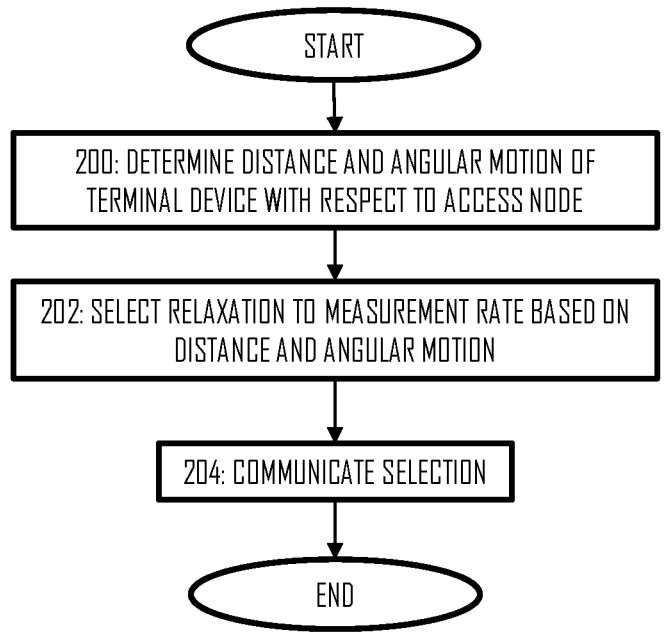
FIG. 2 illustrates a process for determining a measurement interval of a terminal device according to an embodiment.

FIG. 2 illustrates a process for selecting a measurement rate for a terminal device 100. The process may be carried out by an apparatus for the terminal device or by an apparatus for the access node 104, as described in greater detail below. Referring to FIG. 2, the process comprises: determining (block 200), on the basis of measurement data measured from a radio link, a distance between the access node 104 and the terminal device 100 and angular motion of the terminal device with respect to the access node; making (block 202) a decision about a length of a time interval between consecutive radio measurements of the terminal device on the basis of the distance and the angular motion; and communicating the decision over the radio link or another radio link (block 204) and causing the terminal device to conduct the consecutive radio measurements with the length of the time interval.

The radio link may be a radio link between the access node and the terminal device in which case the time interval is communicated between the access node and the terminal device over the same radio link in block 204. In another embodiment, another radio link may be used for measuring the distance and the angular motion, e.g. multiple radio links of a global navigation satellite system (GNSS). The purpose is to measure the distance and the angular motion between the access node and the terminal device, and virtually any positioning solution can be applied the purpose. In such a case, the distance and the angular motion may be measured from one or more radio links and the time interval may be communicated in block 204 over another radio link that is not used in the measurements.

An advantage of using the angular motion as a criterion for the RRM relaxation is a more accurate decisions in the RRM relaxation. For example, the angular motion may be used to provide additional information on the mobility and direction of terminal device in a case where an obstacle degrades the distance measurements. Furthermore, angular (rotary) motion of the terminal device cannot be detected with the distance measurements, because a stationary terminal device and a terminal device in rotary motion at a fixed distance from the access node provide the same distance measurement data. Furthermore, the rotary motion enables pinpointing the direction of the terminal device from the base station site, thus enabling better determination of the distance of the terminal device to the cell edge in a case where the cell edge is not at a uniform distance to all directions from the base station site.

Figure 3:
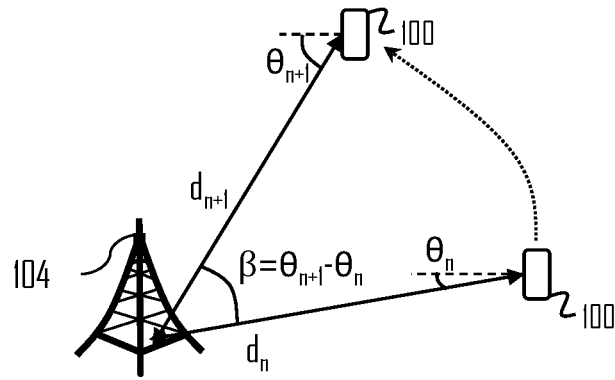
FIG. 3 illustrates measurement of distance and angular motion of a terminal device.

FIG. 3 illustrates an example of the measurements used in the process of FIG. 2. Let at time $t_n$ the distance of the terminal device 100 from the access node be $d_n$ and position be $x_n$ (the absolute position $x_n$ of the terminal device may be omitted to save power). The net effect of motions of the terminal device and the access node can be quantified by looking into the position of the terminal device relative to the position of the access node. In other words, only the distance do from the access node is of interest. Let us assume that a time-of-arrival (TOA) of a direct path between the terminal device and the access node can be resolved from the measurement data. For TOA (or, distance do measurement), we may utilize regularly transmitted reference signals, e.g., downlink or uplink reference signals for RSRP measurements (such as a synchronization signal, a sounding reference signal, or a demodulation reference signal, etc.).

FIG. 3 illustrates the concept of the distance and the angular motion and how they may be measured and defined. The angular motion may be determined by measuring an angle-of-arrival of a received reference signal in different measuring occasions with respect to a reference axis. The reference axis may be provided by a gyroscope, magnetic compass, or other means, and the reference axis is illustrated in FIG. 3 by horizontal dashed lines. In this embodiment, the measurement is performed in the terminal device 100 from a downlink reference signal received from the access node 104. Alternatively, the access node could carry out the measurements described herein on the basis of an uplink reference signal received from the terminal device 100. In this case, the terminal device measures the angles-of-arrival $\theta_n$ and $\theta_{n+1}$ at measurement instants n and n+1. Each measurement instant may be associated with a respective time stamp. Antenna arrays (at the access node or the terminal device) and associated spatial signal processing may be used to measure the angle-of-arrival. The use of multiple antennas at the access node is less complex. Let the measurement time stamps be $t_n$ and $t_{n+1}$, and corresponding measured angle-of-arrival be $\theta_n$ and $\theta_{n+1}$, as shown in FIG. 3. Then the angular motion in terms angular speed or velocity of the terminal device over a time interval $[t_n, t_{n+1}]$ is given by $$\Gamma = \theta_{n+1} - \theta_n.$$

As described above, the distance together with the angular motion may be used for determining the time interval(s) between consecutive RRM measurements, e.g. neighbor cell measurements (and measurement of the serving cell). Thus, the time interval may be understood to indicate duration to the next radio measurement instant. Another interpretation is that the time interval defines a measurement rate of the RRM measurements. The selected measurement rate may be associated with any connectivity state of the terminal device, such as radio resource control (RRC) connected state, RRC, idle state, and RRC inactive state.

Figure 5:
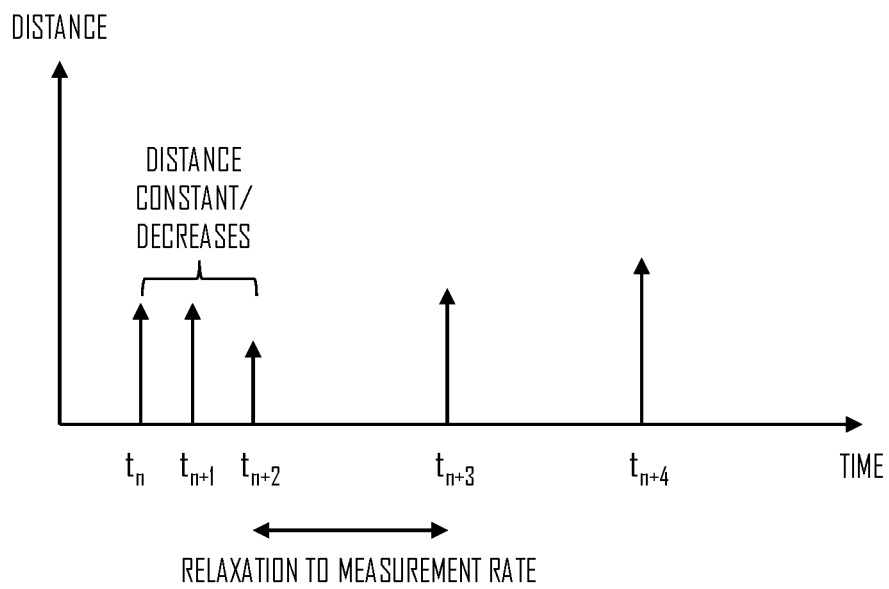
FIGS. 5 and 6 illustrate the selections made in the embodiment of FIG. 4.
Figure 4:
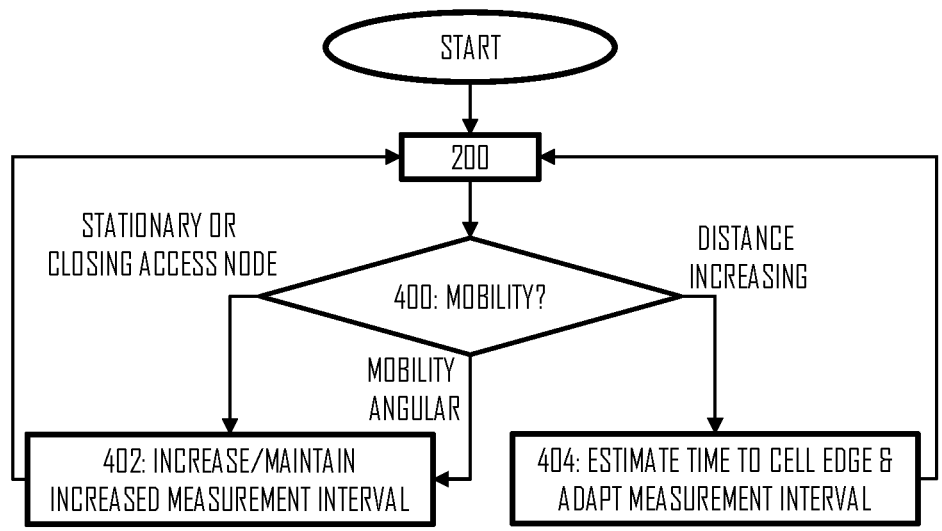
FIG. 4 illustrates a procedure for using angular motion in selection of a measurement interval according to an embodiment.
Figure 6:
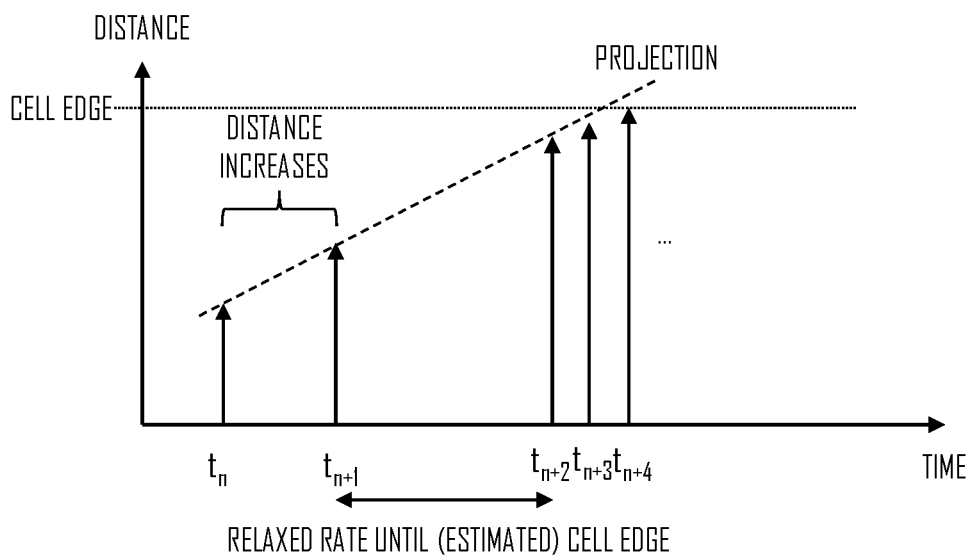

Let us then describe an embodiment of selecting the measurement rate by using the measured distance and angular motion with reference to FIGS. 4 to 6. FIG. 4 illustrates a flow diagram of an embodiment of block 202. Referring to FIG. 4, after determining in block 200 the distance and the angular motion, e.g. $d_n$ and $d_{n+1}$ and β, the mobility of the terminal device with respect to the access node is determined in block 400. Let us remind that the terminal device may be mobile and/or the access node may be mobile.

Upon detecting on that the distance is decreasing or maintaining, a first (longer) time interval may be selected in block 402 for the RRM measurements performed by the terminal device. In case the terminal device initially has used a default measurement interval, the measurement interval may be increased so that the requirements for the RRM measurements are relaxed. In case the terminal device readily used a longer measurement interval, the longer measurement interval may be maintained, or it may even be lengthened. Block 402 may be triggered upon detecting that the distance between the terminal device and the access node is reducing or staying constant.

From the measurements described above in connection with FIG. 3, the following term may be used in block 400:

$$v = \frac{d_{n+1} - d_n}{t_{n+1} - t_n}.$$

In a case where $v \leq 0$, the terminal device is determined to be getting closer to the access node or being stationary with respect to the access node. In such a case, block 402 may be entered and the RRM relaxation may be triggered or continued and the longer measurement interval (smaller measurement rate) may be applied to future measurements. This is illustrated in FIG. 5 where upon detecting on the basis of multiple measurement occasions that the distance is either decreasing or staying constant, the relaxation to the measurement interval is applied and the measurement rate is reduced.

In a case where $0 < v \leq \epsilon$, and $\beta \neq 0$, the terminal device is deemed to be moving around the access node. This is incorporated into the condition by limiting e to a sufficiently small value. The idea is to find out a situation where the terminal device may move away from the access node but at a slow pace. A time it takes for the terminal device to reach the cell edge can be computed and expressed as:

$$T_{clk} = \frac{r - d_{n+1}}{\epsilon}$$

where r is an expected radius of a coverage area of the access node. E can be understood as a threshold proportional to the cell radius. It can be set to such a value that ensures that the terminal device will stay within the coverage area of the cell and not enter the cell edge area within the time $T_{clk}$. From one aspect, E can be understood as a relative speed threshold having a value representing slow speed such as walking speed (5-7 kilometers per hour) or a fraction of the walking speed. With the knowledge of angular movement information and the distance metric (e.g. RSRP) within a limit specified with $\epsilon$, it would be safe to assume that the terminal device will stay within the coverage area of the access node and will not enter the cell edge within the time $T_{clk}$. Accordingly, the terminal device can utilize the RRM relaxation with a suitable relaxation time derived on the basis of $T_{clk}$. For example, the, measurement interval can be set to a fraction of $T_{clk}$, e.g. $\alpha T_{clk}$ where $0<\alpha<1$. This embodiment thus uses the angular motion to trigger selection of this function for computing the time $T_{clk}$ and selecting the measurement interval as the fraction of $T_{clk}$. Upon detecting in block 400 that the distance is increasing, a second time interval shorter than the first time interval is selected. The second time interval may be the default time interval, for example. This may be carried out in block 404. The second time interval may be computed on the basis of a degree of the angular motion. For example, in a case where $v>\epsilon$, the terminal device is determined to be moving toward the cell edge. In such a case, the expected time that UE may take to reach cell boundary can be expressed as $$T_{clk} = \frac{r - d_{n+1}}{v \times \cos(\text{abs}(\beta))}$$

where abs means an absolute value function and cos means a cosine function. The relaxed RRM measurement time interval may then be defined as $\alpha T_{clk}$. After the relaxation, the next measurement occasion $t_{n+2}$ would be at $t_{n+1}+\alpha T_{clk}$. This is illustrated in FIG. 6 where, upon detecting that the distance is increasing, a time duration until the terminal device reaches the cell edge (represented by the dotted horizontal line) is computed and a fraction of that time is selected for the measurement interval. Assuming that the latest measurements were made at time instants $t_n$ and $t_{n+1}$, the next measurement occasion would be relaxed to $t_{n+b\ 2}$ where the time interval between $t_{n+b\ 2}$ and $t_{n+1}$ is longer than the time interval between the $t_{n+1}$ and $t_n$. After $t_{n+b\ 2}$, the terminal device may be assumed to be close to the cell edge so that the default measurement rate (interval) may be applied, as illustrated in FIG. 6 with the greater measurement rate after $t_{n+b\ 2}$, at least for two consecutive measurements in order to determine the motion of the terminal device with respect to the access node at that stage. It may be that the motion vector of the terminal device and/or the access node has changed and that the terminal device is moving towards the access node.

With respect to block 404, information indicating a cell edge in terms of a distance to the access node may be stored in a memory, and the distance and the angular motion indicated by the measurement data may be used to estimate a duration until the terminal device reaches the cell edge, and to select the measurement time interval on the basis of the estimated duration. An as described above, the measurement time interval is shorter than the estimated duration to the cell edge to ensure that the further measurements are performed before the terminal device reaches the cell edge.

From another perspective, block 400 may be used to determine whether the distance is increasing or decreasing. If the distance is determined to be increasing, the distance and the angular motion is used to determine the measurement time interval in block 404. If the distance is determined to be decreasing, the measurement time interval may be determined on the basis of the distance without the angular motion. And if the distance is determined to be constant during the measurement occasion, the angular motion may be used to determine whether or not the motion is rotary, and the measurement time interval may then be computed without the angular motion component, contrary to block 404.

Figure 7:
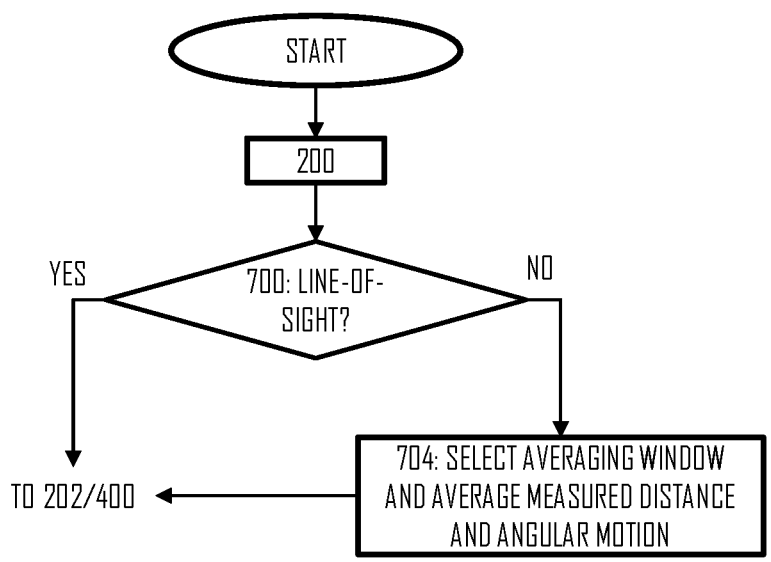
FIGS. 7 and 8 illustrate an embodiment for reducing outliers degrading measurement accuracy.
Figure 8:
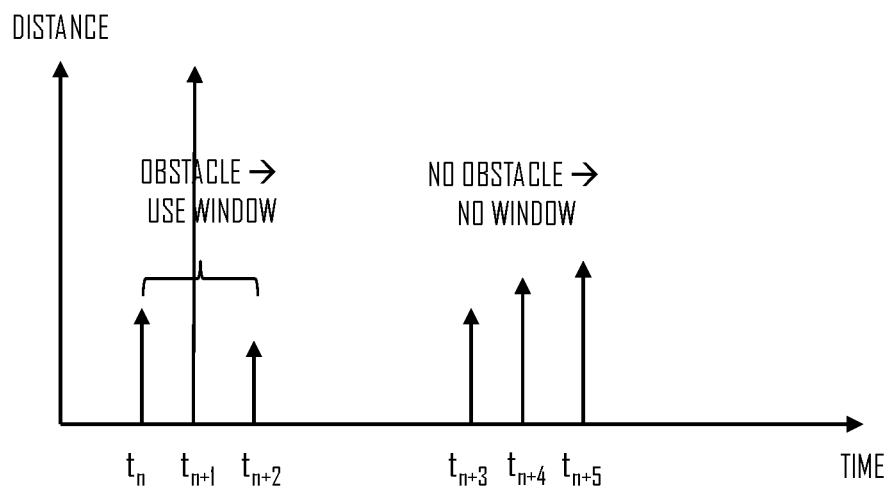

As described above, objects between the terminal device and the access node degrade the distance measurement accuracy. Typically, such obstacles appear and disappear quickly. Therefore, their effect can be reduced by filtering the measurement data. In an embodiment, it is determined on the basis of the measurement data, whether or not there is a line-of-sight between the terminal device and the access node. Upon determining that there is no line-of-sight, the distance and the angular motion may be averaged over a measurement window. FIG. 7 illustrates an embodiment of such a process. The process may be carried out in connection with any one of the above-described embodiments. Referring to FIG. 7, after determining the distance and the angular motion, the presence/absence of the line-of-sight may be determined from the distance measurement data, for example. Referring to FIG. 8, the line of sight may be determined to be present, if the distance follows a steady pattern over consecutive measurement occasions (a first set at $t_n$ to $t_{n+b\ 2}$ and a second set at $t_{n+b\ 3}$ to $t_{n+5}$ in FIG. 8). The first set indicates that the distance suddenly increases and then suddenly decreases. Such a pattern indicates the presence of the obstacle that degrades the measurements. Other patterns may exist and configuring the process to detect such patterns may be configured to block 700. On the other hand, if there is a steady pattern in the consecutive measurements, as with the second set, it may be determined that there is no obstacle or that there is an obstacle so that the averaging window would not remove its effect. Upon detecting that the line-of-sight is present in the measurements, the process may proceed to block 202 or 400, for example. On the other hand, upon detecting the obstacle blocking the line-of-sight in block 700, the averaging window may be selected and the distance and angular motion measurements may be averaged over the window. For example, the averaged distance value and angle of arrival for an $n^{th}$ averaging window wt can be derived as $$d_n^{avg} = \frac{1}{w} \sum_{i=n-w/2}^{n+w/2} d_i$$

$$\theta_n^{avg} = \frac{1}{w} \sum_{i=n-w/2}^{n+w/2} \theta_i$$

Similarly, for $m^{th}$ averaging window the average distance value and angle of arrival $d_m^{avg}$ and $\theta_m^{avg}$ can be found. The purpose of averaging is to reduce an outlier caused by the measurement data corrupted by the presence of the obstacle. Using this average value of measurements the next RRM measurement interval and its relaxation can be selected according to any one of the above-described embodiments.

As described above, the process of FIG. 2 may be performed in the terminal device or in the access node.

Figure 9A:
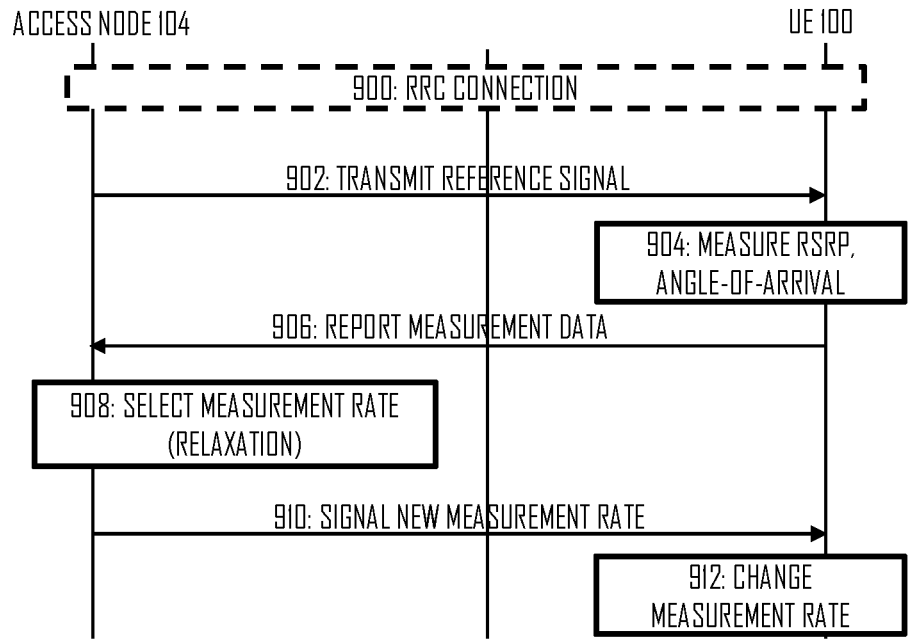
FIGS. 9A to 9C illustrate various embodiments of carrying out the process of FIG. 2.
Figure 9B:
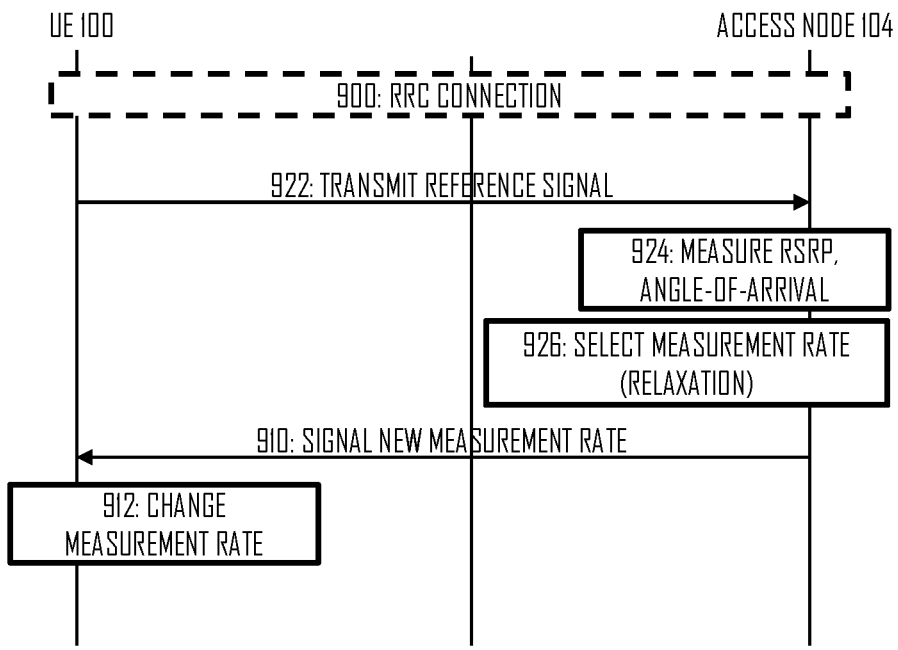
Figure 9C:
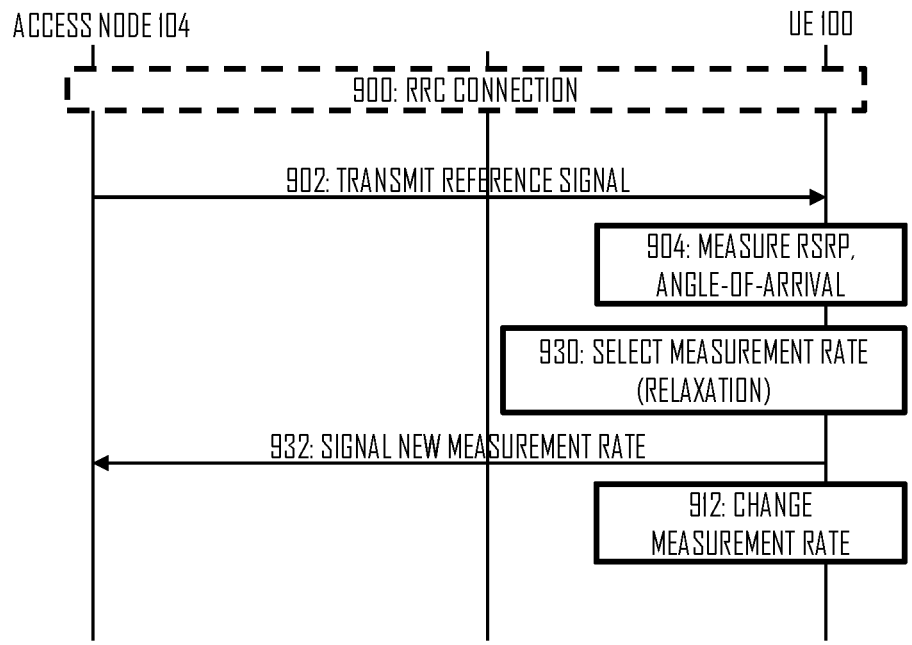

FIGS. 9A to 9C illustrate embodiments of determining the measurement rate and communicating the measurement rate between the terminal device and the access node, e.g. by a system comprising the terminal device and the access node. In FIGS. 9A to 9C, steps denoted by the same reference numbers represent the same or substantially similar steps or functions. Referring to FIG. 9A, the terminal device (UE) 100 and the access node 104 may establish a RRC connection in block 900. As described above, step 900 is optional and the embodiments may be carried out in an RRC idle state as well. Establishment and characteristics of the RRC connections are well known to the skilled person from the literature. In step 902, the access node transmits a downlink reference signal and the terminal device receives the reference signal. In block 904, the terminal device measures the reference signal, e.g. the distance metric such as the RSRP or RSSI and the angle-of-arrival. In step 906, the terminal device reports the measurement data to the access node, including, representing, or indicating the distance and the angular motion. On the basis of the measurement data received in step 906, the access node then carries out the process of FIG. 2 or any one of the above-described embodiments and computes the measurement interval (measurement rate) of the terminal device in block 908. Thereafter, the access node transmits to the terminal device a message indicating the new measurement interval (or measurement rate) in step 910. It may be a relaxation to the current measurement rate, e.g. if the distance is decreasing. In case the measurement rate is maintained, the access node may omit step 910 or the message may carry an indication of maintaining the measurement rate. Upon receiving the new measurement rate, the terminal device changes the measurement rate to follow the new measurement rate in block 912 and carries out the following measurements with the new measurement rate.

In the embodiment of FIG. 9A, the terminal device performs the measurements on the basis of a downlink reference signal, reports the measurement data to the access node, and the access performs the process of FIG. 2. In the embodiment of FIG. 9B, the terminal device transmits an uplink reference signal (step 922) and the access node measures the reference signal received in step 922, generates the respective measurement data (distance and angular motion) in block 924, and performs the process of FIG. 2 (block 926). Thereafter, the access node indicates the new measurement interval or measurement rate to the terminal device (step 910) and the terminal device changes the measurement interval (or rate) in block 912, as described above. In the embodiments of FIGS. 9A and 9B, the terminal device may have an option to overrule the new measurement interval. For example, if the terminal device determines that the relaxation cannot be applied although the access node proposes the relaxation, the terminal device may choose the shorter (e.g. default) measurement interval.

In the embodiment of FIG. 9C, the terminal device receives the downlink reference signal (step 902) and performs the measurements and generation of the measurement data (block 904). Instead of reporting the measurement data to the access node (the report can be optionally made), the terminal device selects the new measurement interval (or measurement rate) in block 930 and reports the selection to the access node in step 932. The access node may then store the current measurement interval. And as described above, the terminal device applies the new measurement interval in block 912. In an embodiment, there are two measurement intervals: the default measurement interval and a relaxed measurement interval, and the indication in step 910 and 932 indicates enablement/disablement of the relaxed measurement interval. Accordingly, the signaling overhead can be reduced.

The process described above is able to find the relaxed RRM measurement time interval for stationary/low-mobility terminal devices, e.g. the terminal device and the access node are moving but the actual distance between them is not changing or changing only slightly (defined by E). The procedure may be described as follows. First, the relative speed between the terminal device and the access node is measured by using existing signals such as the reference signals for RSRP or RSSI measurements. The averaging can be optionally applied to reduce the effect of obstacles so that exit from the relaxed measurement interval is not triggered unnecessarily. Then angular (rotatory) motion of the terminal device with respect to the access node is determined by using the distance and the angular motion. Then, an appropriate relaxation to the RRM measurement time interval is determined for the terminal device. In an embodiment, if the RSRP or RSSI of the serving cell drops below a certain threshold although the terminal device has been determined to be stationary, the terminal device may trigger the RRM relaxation exit condition and start more frequent measurement on the serving cell and optionally the neighbor cells. The frequent measurement of the serving cell may be used for the averaging purpose. In another embodiment, the terminal device may a variation threshold for the distance. For example, if the terminal device determines that the relative speed with respect to the access node is above a certain threshold, more variation in the distance can be allowed without triggering the exit from the relaxed RRM measurements. The variation threshold may be used to determine the level of variance in the distance measurements for triggering the averaging, for example, and the variation threshold may be variable as a function of the speed of the terminal device with respect to the access node.

In an embodiment, the measurement interval may be made gradual and a function of various time intervals the terminal device has been determined to be stationary. For example, upon entering the relaxed RRM measurement interval (or rate), the terminal device may start a timer for determining how long the terminal device has been stationary. The measurement interval may be increased in proportion to the determined duration of being stationary. Detection of motion of the terminal device may immediately trigger exit from the relaxed measurement interval and switch to the default or shorter measurement interval. A similar solution may be used as a condition for entering the relaxed measurement interval, e.g. the terminal device may need to be stationary with respect to the access node for a determined duration before it is allowed to enter the relaxed measurement interval.

Figure 10:
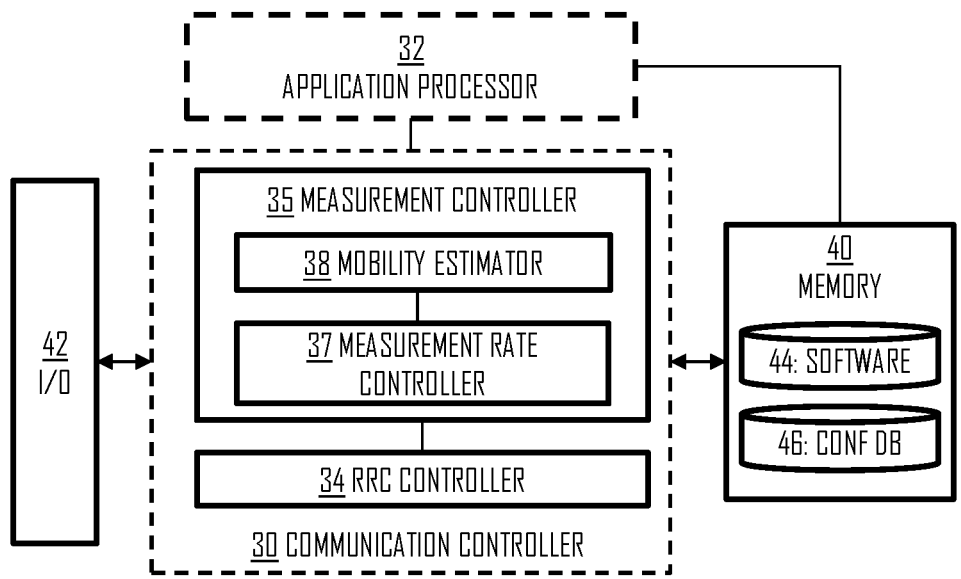
FIG. 10 illustrates a block diagram of a structure of an apparatus according to an embodiment.

FIG. 10 illustrates an apparatus comprising means for carrying out the process of FIG. 2 or any one of the embodiments described above. The apparatus may comprise a processing circuitry, such as at least one processor, and at least one memory 40 including computer program code or computer program instructions (software) 44, wherein the at least one memory and the computer program code (software) are configured, with the at least one processor, to cause the apparatus to carry out the process of FIG. 2 or any one of its embodiments described above. The apparatus may be for the terminal device 100 or for the access node 104. The apparatus may be a circuitry or an electronic device realizing some embodiments of the invention in the terminal device 100 or in the access node 104. The apparatus carrying out the above-described functionalities may thus be comprised in such a device, e.g. the apparatus may comprise a circuitry such as a chip, a chipset, a processor, a micro controller, or a combination of such circuitries for the terminal device 100 or the access node 104. The at least one processor or a processing circuitry may realize a communication controller 30 controlling communications in a radio interface of the cellular communication system in the above-described manner. The communication controller may comprise an RRC controller 34 configured to establish and manage RRC connections, transfer of data over the RRC connections with the access node 104.

The communication controller 30 may comprise a measurement controller 35 configured to perform the RRM measurements, e.g. the neighbour cell measurements and the measurements on a radio link with the serving cell. The measurement controller 35 may comprise a mobility estimator configured to acquire the above-described measurement data describing the distance and the angular motion between the terminal device and the access node. The measurement controller may further comprise a measurement rate controller configured to select the measurement interval on the basis of the measurement data according to any one of the above-described embodiments.

In the embodiment where the apparatus is the terminal device, the apparatus may further comprise an application processor executing one or more computer program applications that generate a need to transmit and/or receive data through the communication controller 10. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The measurements may be beneficial for the applications to ensure the connectivity of the terminal device with the radio access network.

The memory 40 may be implemented using any suitable data storage technology, such as semiconductor-based memory devices, flash memory, magnetic memory devices and systems, optical memory devices and systems, fixed memory and removable memory. The memory may further store a configuration database storing, for example, the measurement interval and/or criteria for selecting the measurement interval.

The apparatus may further comprise a communication interface 42 comprising hardware and/or software for providing the apparatus with radio communication capability, as described above. The communication interface 42 may include, for example, an antenna, one or more radio frequency filters, a power amplifier, and one or more frequency converters. The communication interface 42 may comprise hardware and software needed for realizing the radio communications over the radio interface, e.g. according to specifications of an LTE or 5G radio interface. The communication interface may enable the above-described RRM measurements, e.g. the measurement of the reference signals for estimating the distance and the angle-of-arrival.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 3 to 9C, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units. References to computer-readable program code, computer program, computer instructions, computer code etc. should be understood to express software for a programmable processor such as programmable content stored in a hardware device as instructions for a processor, or as configured or configurable settings for a fixed function device, gate array, or a programmable logic device.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus, comprising:
   at least one processor; and
   at least one memory configured to store instructions that cause the at least one processor to perform at least the following:
   determining, on the basis of measurement data, a distance between an access node and a terminal device and angular motion of the terminal device with respect to the access node, wherein the angular motion is determined by measuring an angle-of-arrival of a received reference signal in different measuring occasions with respect to a reference axis;
   storing information indicating a cell edge in terms of a distance between the cell edge and the terminal device;

using the distance and the angular motion indicated by the measurement data to estimate a duration until the terminal device reaches the cell edge;

making a decision about a length of a time interval between consecutive radio measurements of the terminal device on the basis of the distance, the angular motion, and the estimated duration; and communicating the decision over the radio link or another radio link and causing the terminal device to conduct the consecutive radio measurements with the length of the time interval.

2. The apparatus of claim 1, wherein the time interval indicates duration to the next radio measurement instant.

3. The apparatus of claim 1, wherein the apparatus is configured select a first time interval upon detecting that the distance is decreasing or maintaining, and to select a second time interval shorter than the first time interval upon detecting that the distance is increasing.

4. The apparatus of claim 3, wherein the apparatus is configured to compute at least the second time interval on the basis of a degree of said angular motion.

5. The apparatus of claim 1, wherein the time interval is shorter than the estimated duration.

6. The apparatus of claim 1, wherein the apparatus is configured to:

determine whether the distance is increasing or decreasing;

if the distance is determined to be increasing, use the distance and the angular motion to determine the time interval;

if the distance is determined to be decreasing, determining the time interval on the basis of the distance without the angular motion.

7. The apparatus of claim 6, wherein the apparatus is configured to perform the following, if the distance is determined to be increasing:

if the distance is determined to be increasing but at a speed lower than a determined threshold and if the angular motion is determined to be non-zero, computing the time interval on the basis of a distance to an edge of a cell provided by the access node and the threshold; and if the distance is determined to be increasing at a speed greater than the threshold, computing the time interval on the basis of the distance to the cell edge, the speed, and the angular motion.

8. The apparatus of claim 1, wherein the apparatus is configured to determine, on the basis of the measurement data, whether or not there is a line-of-sight between the terminal device and the access node and, upon determining that there is no line-of-sight, to average the distance and the angular motion over a measurement window.

9. A method, comprising:

determining, on the basis of measurement data measured from a radio link, a distance between an access node and a terminal device and angular motion of the terminal device with respect to the access node, wherein the angular motion is determined by measuring an angle-of-arrival of a received reference signal in different measuring occasions with respect to a reference axis;

storing information indicating a cell edge in terms of a distance between the cell edge and the terminal device;

using the distance and the angular motion indicated by the measurement data to estimate a duration until the terminal device reaches the cell edge;

making a decision about a length of a time interval between consecutive radio measurements of the terminal device on the basis of the distance, the angular motion, and the estimated duration; and communicating the decision over the radio link or another radio link and causing the terminal device to conduct the consecutive radio measurements with the length of the time interval.

10. The method of claim 9, wherein a first time interval is selected upon detecting that the distance is decreasing or maintaining, and wherein a second time interval shorter than the first time interval is selected upon detecting that the distance is increasing.

11. The method of claim 10, wherein at least the second time interval is computed on the basis of a degree of said angular motion.

12. The method of claim 9, further comprising:

determining whether the distance is increasing or decreasing;

if the distance is determined to be increasing, using the distance and the angular motion to determine the time interval;

if the distance is determined to be decreasing, determining the time interval on the basis of the distance without the angular motion.

13. The method of claim 9, comprising determining, on the basis of the measurement data, whether or not there is a line-of-sight between the terminal device and the access node and, upon determining that there is no line-of-sight, to average the distance and the angular motion over a measurement window.

14. The method of claim 9, wherein the method is performed by the terminal device, and wherein said communicating comprises the terminal device transmitting the time interval to the access node.

15. The method of claim 9, wherein the method is performed by the access node, and wherein the access node configures the terminal device to conduct the measurements by transmitting the time interval to the terminal device.

16. A computer program embodied on a non-transitory computer-readable medium, and comprising computer program code readable by a computer, wherein the computer program code, when executed by the computer, configures the computer to carry out a computer process comprising:

determining, on the basis of measurement data measured from a radio link, a distance between an access node and a terminal device and angular motion of the terminal device with respect to the access node, wherein the angular motion is determined by measuring an angle-of-arrival of a received reference signal in different measuring occasions with respect to a reference axis;

storing information indicating a cell edge in terms of a distance between the cell edge and the terminal device;

using the distance and the angular motion indicated by the measurement data to estimate a duration until the terminal device reaches the cell edge;

making a decision about a length of a time interval between consecutive radio measurements of the terminal device on the basis of the distance, the angular motion, and the estimated duration; and communicating the decision over the radio link or another radio link and causing the terminal device to conduct the consecutive radio measurements with the length of the time interval.

* * * * *